US012621181B1

(12) United States Patent
Huggar et al.

(10) Patent No.: US 12,621,181 B1
(45) Date of Patent: May 5, 2026

(54) SYSTEMS AND METHODS TO DETERMINE ACTIVITY VIA WIRELESS AND SOUND SIGNALS

(71) Applicant: United Services Automobile Association (USAA), San Antonio, TX (US)

(72) Inventors: Stacy Callaway Huggar, San Antonio, TX (US); Emily Kathleen Krebs, San Antonio, TX (US); Jeffrey Neal Pollack, San Antonio, TX (US); Carlos JP Chavez, San Antonio, TX (US); Stefanie Jean Acosta, San Antonio, TX (US); Janelle Denice Dziuk, Falls City, TX (US); Mitzi Ruiz, San Antonio, TX (US); Michael Joseph Gaeta, San Antonio, TX (US); Agatha Maria Morey, New Braunfels, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 518 days.

(21) Appl. No.: 18/209,261

(22) Filed: Jun. 13, 2023

Related U.S. Application Data

(63) Continuation of application No. 16/821,246, filed on Mar. 17, 2020, now Pat. No. 11,792,038.

(Continued)

(51) Int. Cl.
*H04L 12/28* (2006.01)
*H04L 67/125* (2022.01)

(52) U.S. Cl.
CPC ........ *H04L 12/2823* (2013.01); *H04L 67/125* (2013.01); *H04L 2012/2841* (2013.01); *H04L 2012/2849* (2013.01)

(58) Field of Classification Search
CPC .............. H04L 12/2823; H04L 67/125; H04L 2012/2841; H04L 2012/2849
(Continued)

(56) References Cited

U.S. PATENT DOCUMENTS

| | | | | |
|---|---|---|---|---|
| 10,436,615 B2 * | 10/2019 | Agarwal | ................ | G01D 9/005 |
| 11,765,501 B2 * | 9/2023 | Eswara | .................. | H04R 3/005 |
| | | | | 381/92 |

(Continued)

FOREIGN PATENT DOCUMENTS

| | | | | | |
|---|---|---|---|---|---|
| CA | 3091482 A1 * | 8/2019 | ............ | H04W 4/029 |
| CA | 3065611 A1 * | 6/2020 | ............. | G06F 16/65 |
| RU | 2669128 C2 * | 10/2018 | ......... | G01N 29/4454 |

OTHER PUBLICATIONS

Hongbo Jiang, Chao Cai, Xiaoqiang Ma, Yang Yang, Jiangchuan Liu, Smart Home Based on WiFi Sensing: A Survey, Mar. 28, 2018, IEEE Access, vol. 6.

*Primary Examiner* — Crystal J Barnes-Bullock
(74) *Attorney, Agent, or Firm* — Fletcher Yoder, P.C.

(57) ABSTRACT

A system includes a transceiver configured to receive one or more Wi-Fi signals associated with a structure, and a processor having computer-executable instructions. When executed, the instructions are configured to cause the processor to perform operations that include receiving the one or more Wi-Fi signals via the transceiver, comparing the one or more Wi-Fi signals with a signal profile, and determining whether an anomaly activity is occurring in the structure based on comparison between the one or more Wi-Fi signals and the signal profile.

20 Claims, 5 Drawing Sheets

Related U.S. Application Data

(60) Provisional application No. 62/820,068, filed on Mar. 18, 2019.

(58) Field of Classification Search
USPC ........................................................ 700/295
See application file for complete search history.

(56) References Cited

U.S. PATENT DOCUMENTS

| | | | | |
|---|---|---|---|---|
| 11,792,038 B1 * | 10/2023 | Huggar | .............. | H04L 12/2823 |
| | | | | 700/295 |
| 11,804,240 B2 * | 10/2023 | Chang | .................... | G10L 25/51 |
| 12,105,505 B2 * | 10/2024 | Hasanian | ........... | G01N 29/4454 |
| 2019/0033446 A1 | 1/2019 | Bultan et al. | | |
| 2022/0293123 A1 * | 9/2022 | Ramirez | ................ | G10L 25/66 |

* cited by examiner

180

TRANSMIT SIGNALS WITHIN A STRUCTURE — 182

RECEIVE RESULTANT SIGNALS ASSOCIATED
WITH TRANSMITTED SIGNALS — 184

CREATE INITIAL WIRELESS AND SOUND SIGNAL PROFILES — 186

MODIFY THE WIRELESS AND SOUND SIGNAL PROFILES
TO FINALIZE WIRELESS AND SOUND SIGNAL PROFILES — 188

SYSTEMS AND METHODS TO DETERMINE ACTIVITY VIA WIRELESS AND SOUND SIGNALS

CROSS REFERENCE TO RELATED APPLICATIONS

This application is a continuation of U.S. patent application Ser. No. 16/821,246, entitled "SYSTEMS AND METHODS TO DETERMINE ACTIVITY VIA WIRELESS AND SOUND SIGNALS," filed Mar. 17, 2020, which claims priority to and the benefit of U.S. Provisional Application Ser. No. 62/820,068, entitled "SYSTEMS AND METHODS TO DETERMINE ACTIVITY VIA WIRELESS AND SOUND SIGNALS" and filed Mar. 18, 2019, each of which is hereby incorporated by reference in its entirety for all purposes.

BACKGROUND

The present disclosure relates generally to determining activities associated with a structure and, more specifically, relates to using wireless and/or audio signals to determine activities associated with a structure.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

Certain activities may occur in structures, such as corporate buildings, homes, and the like. For example, human activity and/or device activity may regularly occur within such structures. In some circumstances, an anomalous activity may occur in a particular structure. This anomalous activity may impact other activities occurring in that structure. For example, an activation of an automated device (e.g., vacuum cleaner) that is not scheduled to be in operation may be occurring in a structure, while another device or system in the structure is scheduled to operate. In some cases, the operation of automated device may impede the operation of the other device or system in the structure. To improve the coordination between the operations of various automated devices within a structure, it may be useful to identify improved systems and methods for detecting anomalous activities quickly to mitigate the impact of these activities on the operation of other activities.

BRIEF DESCRIPTION

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In an embodiment, a system includes a transceiver configured to receive one or more Wi-Fi signals associated with a structure, and a processor having computer-executable instructions. When executed, the instructions are configured to cause the processor to perform operations that include receiving the one or more Wi-Fi signals via the transceiver, comparing the one or more Wi-Fi signals with a signal profile, and determining whether an anomaly activity is occurring in the structure based on comparison between the one or more Wi-Fi signals and the signal profile.

In an embodiment, a system includes a sensor configured to receive one or more audio signals associated with a structure and a processor having computer-executable instructions. When executed, the instructions are configured to cause the processor to perform operations that include receiving the one or more audio signals via the sensor, comparing the one or more audio signals to one or more expected audio signals, and determining that an anomaly activity is occurring in response to determining that the one or more audio signals vary from the one or more expected audio signals by a threshold.

In an embodiment, a system includes a transceiver configured to receive one or more Wi-Fi signals associated with a structure, a sensor configured to receive one or more audio signals associated with the structure, and a processor comprising computer-executable instructions. When executed, the instructions are configured to cause the processor to perform operations that include receiving the one or more Wi-Fi signals via the transceiver, receiving the one or more audio signals via the sensor, and comparing the one or more Wi-Fi signals and the one or more audio signals to one or more expected Wi-Fi signals and one or more expected audio signals, respectively, and outputting a control signal to a device associated with the structure in response to the determining that the one or more Wi-Fi signals vary from the one or more expected Wi-Fi signals by more than a first threshold, determining that the received one or more audio signals vary from the one or more expected audio signals by more than a second threshold, or both.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
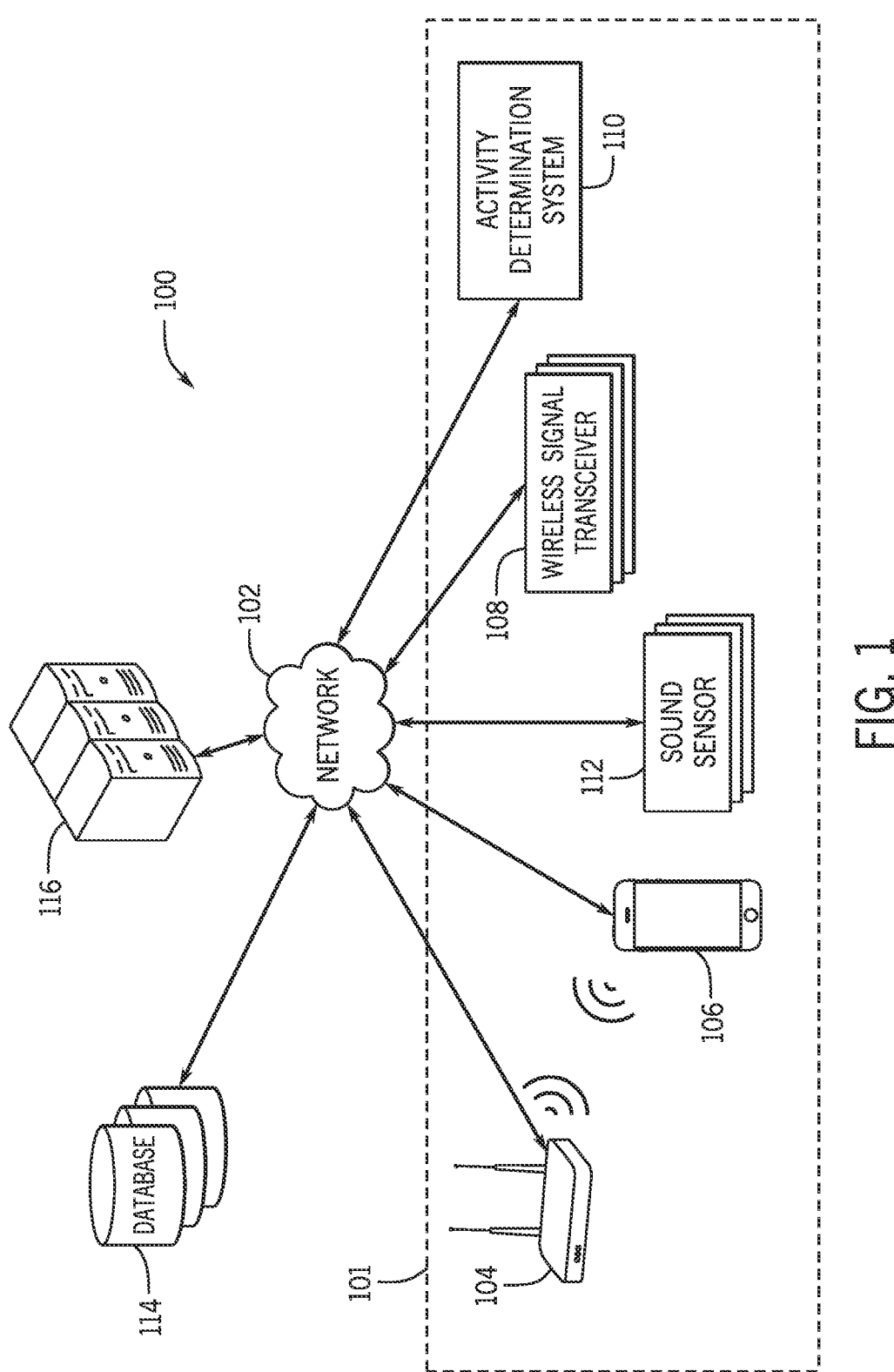
FIG. 1 is a schematic view of a sensing system implemented to monitor certain wireless and/or audio signals within a structure, in accordance with embodiments described herein.

One or more specific embodiments of the present disclosure are described above. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

The present disclosure relates to using certain wireless (e.g., Wi-Fi) and/or audio signals of a structure to determine anomalous activities occurring and are associated with the structure. As referred to herein, a structure may include any building or enclosure, such as a residential home, a corporate building, a hospital, or a construction site. Certain activities, may be occurring within the structure. The activities may be a regular or expected activity or, in contrast, an anomalous activity. As an example, a regular or expected activity may include an activity that occurs as scheduled (e.g., occurring at a particular day and/or time of each week) and/or is determined to be characteristic of the structure (e.g., fluid flow in piping at certain locations within a residential home). An anomalous activity may include an activity that does not occur regularly according to a schedule, or can be uncharacteristic to previous activities associated with the structure (e.g., fluid flow outside of piping at other locations of a residential home).

The occurrence of an anomalous activity may impact the structure, such as an operation of the structure and/or a device of the structure. For example, fluid flow outside of piping (e.g., leak in piping) of a residential home may affect a structural integrity of the residential home. Thus, it may be desired to mitigate the impact of an anomalous activity, such as by adjusting an operation of a certain device of the structure in response to the detected anomalous activity. However, it may be difficult to detect an occurrence of an anomalous activity and quickly mitigate the anomalous activity's effect on the structure. For example, the anomalous activity's existence may not be determined until an operator or user observes the anomalous activity long after the anomalous activity has occurred.

As such, in certain embodiments disclosed herein, a system determining the occurrence of an anomalous activity may provide improvements to respond to the anomalous activity. By way of example, an activity may be determined via certain signals, such as wireless and/or audio signals. As will be further discussed herein, activities, including physical movement, may disturb or interfere with emitted wireless signals in such a manner that the interference may be determined by a sensing system. Moreover, some activities may also produce audio that may be determined by the sensing system. Based on the interference of the wireless signals and/or the detected audio signals, an activity determination system may determine if such activities are anomalies or uncharacteristic to the profiles associated with the structure. If the activity determination system detects an anomalous activity, the activity determination system may then output a control signal (e.g., a command) to adjust an operation of a device and/or to alert an operator or user of the structure. In this manner, the activity determination system may quickly mitigate the impact of the anomalous activity. Although the present disclosure primarily discusses determining wireless and audio signals, in additional embodiments, other signals may be used to determine activity, such as signals indicative of temperature, energy consumption, or another suitable signal associated with the structure. Additional details with regard to using wireless and audio signals to detect activities within a structure will be discussed below with reference to FIGS. 1-5.

By way of introduction, FIG. 1 is a schematic view of a sensing system 100 that is communicatively coupled to various devices within a structure 101, in which the sensing system 100 is implemented to monitor signals, such as wireless and/or audio signals, within the structure 101. The sensing system 100 may include a network 102 that may be accessible to the devices in the structure 101. The network 102 may include one or more computing networks, such as local area networks (LAN), wide area networks (WAN), Internet, and/or another suitable remote network, to enable data transfer between components of the sensing system 100. For example, the sensing system 100 may include a router 104 disposed within the structure 101 and implemented to send and receive data via wireless signals. As used herein, wireless signals, or Wi-Fi signals, are electromagnetic waves that are transmitted at a certain frequency (e.g., 2.4 gigahertz [GHz] or 5 GHz) within the structure 101. In some embodiments, the router 104 may be communicatively coupled to a computing device 106, which may be a laptop, tablet, cell phone, and the like, that may be capable of sending and receiving wireless signals. As an example, the router 104 may be implemented to receive data, convert the data into wireless signals, and emit the wireless signals through the space within the structure 101. The computing device 106 may capture the emitted wireless signals traveling through the structure 101, and convert the wireless signals back into data. The computing device 106 may also be implemented to transmit additional data to the router 104 via wireless signals.

The emitted wireless signals may travel within the structure 101 in particular manner, such as through walls of the structure 101. However, certain objects within the structure may interfere with how the wireless signals travel. For example, wireless signals may reflect off a person's body within the structure. The structure 101 may also include one or more wireless signal transceivers 108 (e.g., Wi-Fi transceivers) that may receive the wireless signals emitted by the router 104 and/or the computing device 106 and determine the manner at which the wireless signals travel within the structure 101. The structure 101 may also include an activity determination system 110 that may be communicatively coupled to the wireless signal transceivers 108. The activity determination system 110 may receive and analyze the wireless signals received by the wireless signal transceivers 108. For instance, by determining the manner in which the wireless signals travel within the structure 101, the activity determination system 110 may substantially map out the interior of the structure 101. That is, the activity determination system 110 may determine the location of objects within the structure 101 based on the changes that occur to the wireless signals, such as to what extent the wireless signals are unimpeded, inhibited, blocked, reflected, or otherwise changed within the structure. In some implementations, the activity determination system 110 may determine a geometry of the objects disposed within the structure 101 and may determine particular objects (e.g., a person) based on the geometry of the object. In further implementations, the activity determination system 110 may determine an action that is performed by the object (e.g., a person is walking) based on a change of geometry and/or location of the object within the structure 101.

In some embodiments, there may be multiple wireless signal transceivers 108 disposed in the structure 101 at different locations to increase an accuracy of determining activities associated with the structure 101. For example, a first wireless signal transceiver 108 may receive unique wireless signals from a second wireless signal transceiver 108 or other suitable device. If the wireless signal traverses across the interior of the structure 101 without encountering any interference (e.g., walls, electric noise, other signals), the wireless signal received at the first wireless signal transceiver 108 may include a set of expected properties (e.g., latency time, amplitude, phase). Based on a difference between the set of expected properties and the set of actual properties of the wireless signals received at the first wireless signal transceiver 108, the activity determination system 110 may generate an image representative of the interior of the structure 101. In some embodiments, the set of expected properties may correspond to a vacant or unoccupied state of the interior of the structure 101. As such, the differences between the set of expected properties and the set of actual properties of the wireless signals may be indicative of a presence of objects or individuals within the interior of the structure 101. In some embodiments, the activity determination system 110 may cross-reference each generated image with other generated images stored in a storage component or the like to determine or identify objects that may be present in the interior of the structure 101.

In addition to receiving wireless signals, the wireless signal transceivers 108 may also transmit wireless signals into the structure 101. For example, the wireless signal transceivers 108 may transmit test or dummy wireless signals that are separate from the wireless signals emitted by the router 104 and the computing device 106. The test wireless signals may travel across the structure 101, be received by the wireless signal transceivers 108, be retrieved by the activity determination system 110, and be analyzed by the activity determination system 110 to map out the interior of the structure 101. As such, the wireless signal transceiver 108 may be used to determine activities associated with the structure 101 without relying on the router 104 and/or the computing device 106 to transmit wireless signals.

In some embodiments, the activity determination system 110 may also recognize the location of each wireless signal transceiver 108 within the structure 101 based on the wireless signal received by the respective wireless transceiver 108. In this way, the activity determination system 110 may generate different images from different perspectives of points of view with respect to the various locations within the structure 101 that correspond to directions in which the various wireless transceivers 108 may transmit the respective wireless signals.

In additional embodiments, the activity determination system 110 may recognize certain computing devices 106 that may be communicatively coupled to the router 104. That is, the activity determination system 110 may store an identification of each computing device 106 that becomes connected or linked to the router 104, such that the activity determination system 110 recognizes the computing devices 106. For example, when a particular computing device 106 communicatively couples to the router 104 for the first time, the activity determination system 110 may store an identification of the particular computing device 106. Subsequently, the activity determination system 110 may recognize the particular computing device 106 while the particular computing device 106 remains communicatively coupled to the router 104. As such, the activity determination system 110 may determine when the particular computing device 106 is in the structure 101 and/or is in range of the router 104. In certain implementations, the activity determination system 110 may also determine a location of the particular computing device 106 within the structure 101, such as based on how the particular computing device 106 receives wireless signals transmitted by the router 104.

The sensing system 100 may also include an audio or sound sensor 112 implemented to receive audio or sound signals associated with the structure 101. In certain embodiments, the audio sensor 112 may be implemented to determine an intensity of audio signals in decibels (dB) and/or a frequency of audio signals in Hz. The activity determination system 110 may be communicatively coupled to the audio sensor 112 and may receive data associated with audio received by the audio sensor 112. Thus, the activity determination system 110 may be configured to determine an activity associated with the structure 101 based on the intensity of audio signals. Additionally, the activity determination system 110 may be implemented to determine the location of where each audio signal is produced with respect to the structure 101. For example, the structure 101 may include multiple audio sensors 112 disposed at different locations within the structure 101. Each of the audio sensors 112 may receive an intensity of a particular audio signal. Based on the respective intensities of the particular audio signal determined by the audio sensors 112, and a comparison of the respective locations of the audio sensors 112, the activity determination system 110 may determine the location in which the particular audio signal originated. Additionally, the activity determination system 110 may determine a type of audio signal, such as based on a frequency, an intensity, and so forth, of the audio signal.

The network 102 may facilitate data transfer from the router 104, the computing device 106, and/or the audio sensor 112 to one or more databases 114. The database(s) 114 may be implemented to store the transferred data. For example, the database(s) 114 may store data regarding the wireless signals received by the wireless signal transceivers 108, and data regarding the audio signals received by the audio sensor 112. The sensing system 100 may also include one or more server(s) 116 that may be communicatively coupled to the database(s) 114 via the network 102. The server(s) 116 may be application servers, for example, implemented to access and process the data stored in the database(s) 114. For instance, the server(s) 116 may retrieve wireless data from the database(s) 114 and send the wireless data to activity determination systems 110 associated with other structures 101.

Figure 2:
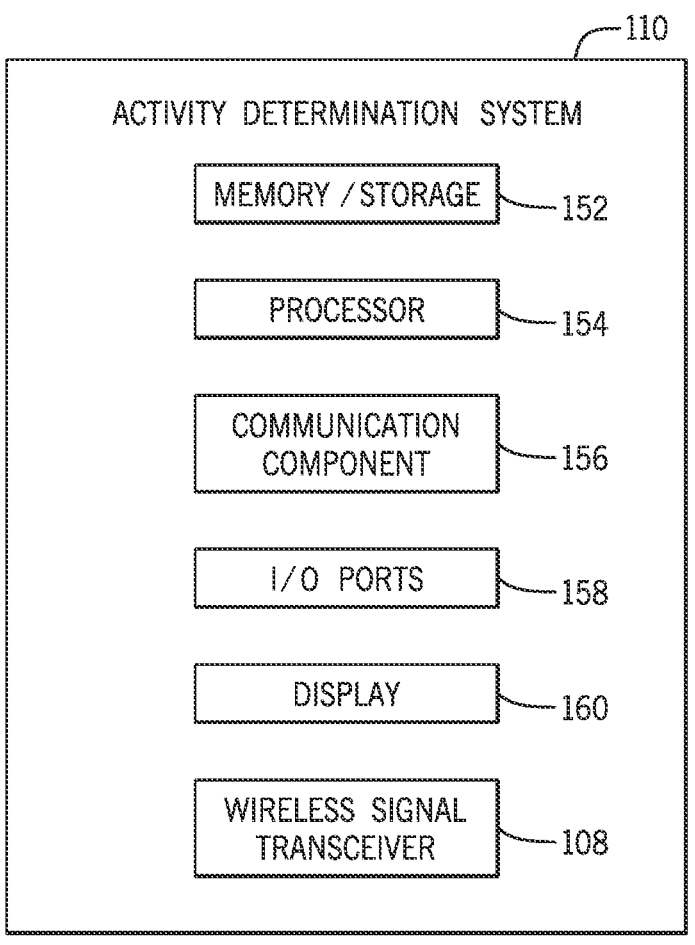
FIG. 2 is a schematic view of an activity determination system implemented to determine activities associated with the structure, in accordance with embodiments described herein.

FIG. 2 is a schematic view of an embodiment of the activity determination system 110 implemented to determine activities associated with the structure 101. The activity determination system 110 may be a part of the sensing system 100 (e.g., as part of the server[s] 116) and/or may be communicatively coupled to the sensing system 100. Generally, the activity determination system 110 may receive wireless signals and audio signals. The activity determination system 110 may determine activities based on the received wireless signals and audio signals. In some embodiments, the activity determination system 110 may receive the wireless signals directly from the wireless signal transceiver 108 and receive the audio signals directly from the audio sensor 112. In additional embodiments, the activity determination system 110 may access and retrieve wireless and audio signals that were previously received by the wireless signal transceiver 108 and the audio sensor 112, respectively. For example, the activity determination system 110 may retrieve the wireless and audio signals from a stored database, such as the database(s) 114 of the sensing system 100, and analyze the wireless and audio signals thereafter.

To perform the operations described herein, the activity determination system 110 may include a memory and/or storage 152. The memory 152 may be a storage device, a flash memory device, removable memory, or any other non-transitory computer-readable medium. The memory 152 may also include volatile memory, such as randomly accessible memory (RAM), and/or non-volatile memory, such as hard disk memory, flash memory, and/or other suitable memory formats. For example, the memory 152 may include or be communicatively coupled to the database (s) 114 implemented to store data transmitted by the router 104, the computing device 106, and/or the audio sensor 112. Moreover, the memory 152 may be implemented to store non-transitory, computer-readable media (e.g., any suitable form of memory or storage) that may store code (e.g., software code) executable by one or more processors 154 of the activity determination system 110. For example, the processor(s) 154 may execute code to perform various techniques described herein to determine activities associated with the structure 101 and determine anomalous activities.

In some embodiments, the activity determination system 110 includes a communication component 156 to communicatively couple the activity determination system 110 to other devices or components. For example, the communication component 156 may enable the activity determination system 110 to access data stored in the database(s) 114, to execute applications of the server(s) 116, to transmit data to the computing device 106, and so forth. Moreover, the activity determination system 110 may include input/output (I/O) ports 158 that may couple to other components, such as input devices (e.g., touch screen, keyboard, mouse device) that receive user input, sensors that detect other parameters of the structure 101, and so forth. In some implementations, the activity determination system 110 may include a display 160 that may depict visualizations. For example, the display 160 may show the data retrieved by the activity determination system 110, code executed by the processors 154, and so forth.

The wireless signal transceivers 108 may also be considered to be a part of the activity determination system 110. As an example, the processor 154 may be configured to instruct the wireless signal transceivers 108 to emit wireless signals through the structure 101 independently of the wireless signals emitted by the router 104 and the computing device 106. Thus, the wireless signal transceivers 108 may receive wireless signals, and the activity determination system 110 may determine activities associated with the structure 101 even if the router 104 and the computing device 106 are not transmitting wireless signals.

Figure 3:
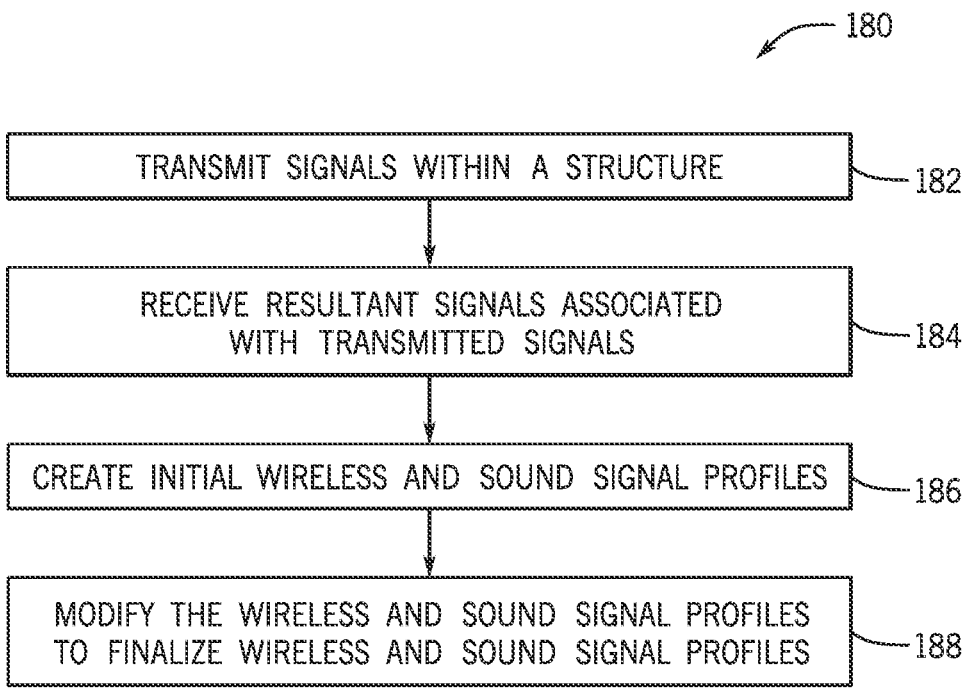
FIG. 3 is a block diagram of an embodiment of a method for establishing certain wireless and/or audio signal profiles, in accordance with embodiments described herein.
Figure 4:
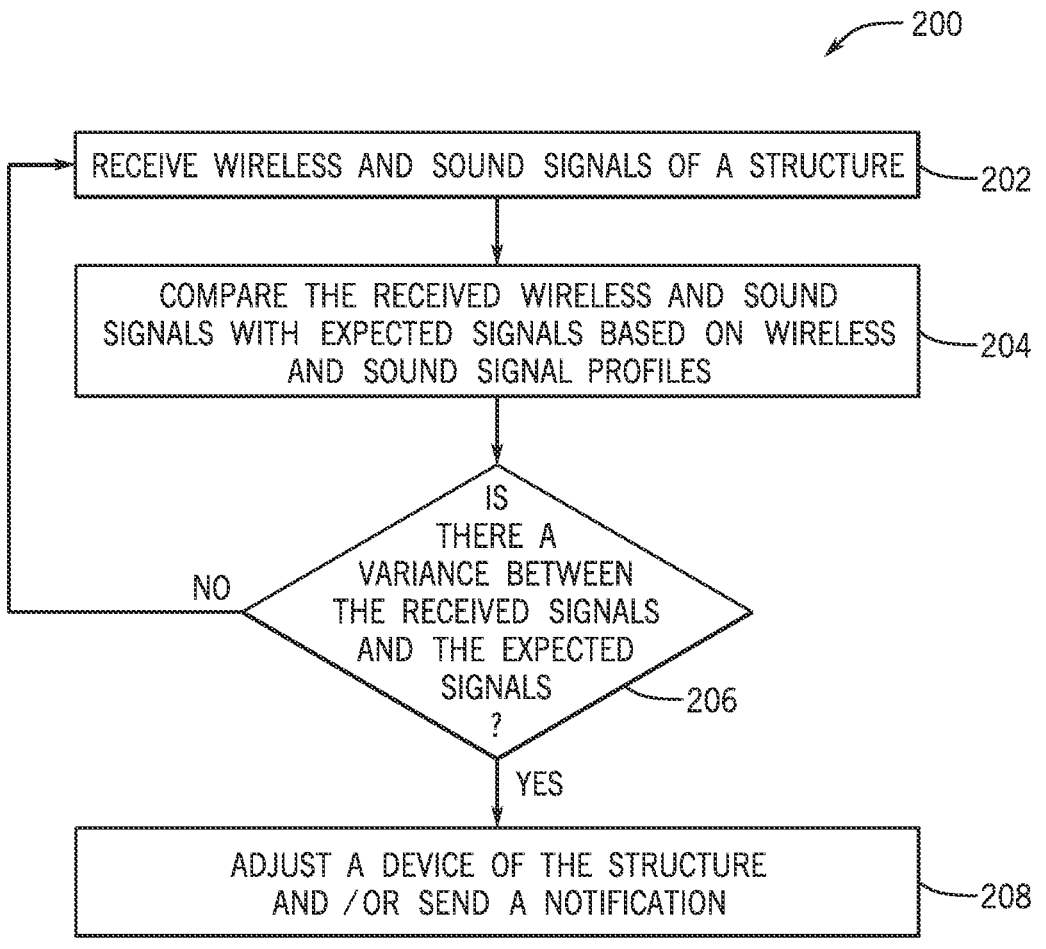
FIG. 4 is a flowchart of an embodiment of a method for determining an anomalous activity by referencing established wireless and/or audio signal profiles, in accordance with embodiments described herein.
Figure 5:
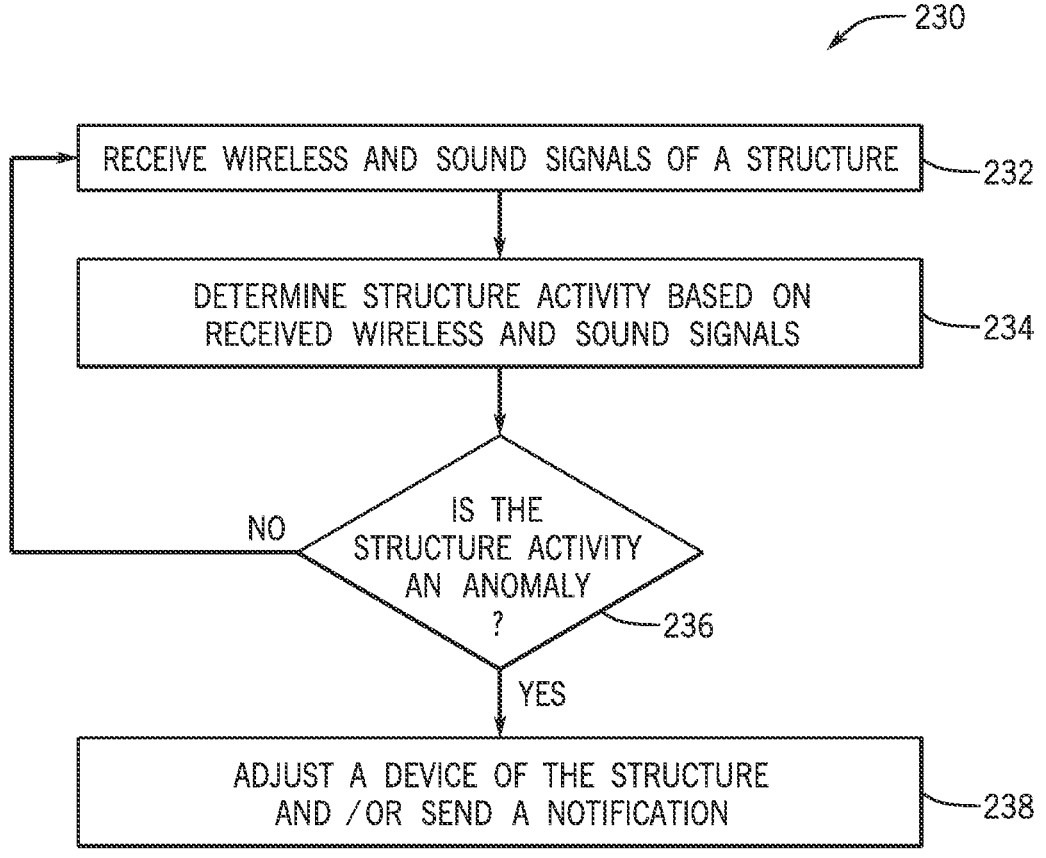
FIG. 5 is a flowchart of another embodiment of a method for determining an anomalous activity by determining an activity based on received wireless and/or audio signals, in accordance with embodiments described herein.

FIGS. 3-5 each illustrate an embodiment of a method to process wireless and/or audio signals of a structure 101 in accordance with the embodiments described herein. In some embodiments, each method may be performed by the activity determination system 110, such as via the processor 154. Additionally, it should be noted that each illustrated method is not an exclusive embodiment. In other words, additional steps or different steps may be performed relative to the steps depicted in FIGS. 3-5. For example, the steps of FIGS. 3-5 may be different for different embodiments of the activity determination system 110, and/or the steps may be performed in any suitable order, such as the same or a different order shown in the respective FIGS. 3-5.

FIG. 3 is a block diagram of an embodiment of a method or process 180 implemented to establish wireless and/or audio signal profiles. At block 182, the activity determination system 110 may transmit signals within the structure 101. In some embodiments, the activity determination system 110 may instruct the wireless signal transceiver 108 to transmit wireless signals through the structure 101. The wireless signals may be test signals that are sent by the wireless signal transceiver 108, received by the wireless signal transceiver 108 after traveling within the structure 101, and analyzed to determine an image of the structure 101.

At block 184, the activity determination system 110 receives resultant signals of the structure 101 that are associated with transmitted signals, in which the resultant signals may be associated with wireless signals received by the wireless signal transceiver 108 and/or audio signals received by the audio sensor 112. In regard to resultant wireless signals, the activity determination system 110 may determine a manner at which wireless signals travel within the structure 101, an identification of any computing devices 106 that may be communicatively coupled to the router 104, or other parameters associated with the wireless signals. For example, the activity determination system 110 may determine a location and/or a geometry of an object in the structure 101 by determining the wireless signal traveled around a space, such as a space occupied by an object that obstructs or blocks the wireless signals from traveling through object. In a further example, the activity determination system 110 may identify computing devices 106 based on data incorporated within received wireless signals. For example, the activity determination system 110 may interpret data included in the wireless signals transmitted by the router 104 and/or the computing device 106, and may use the interpreted data to identify the particular computing device 106 communicating the wireless signals.

As related to the audio signals, the activity determination system 110 may determine an intensity of each audio signal, a location of each audio signal, a frequency of each audio signal, and so forth. As mentioned, each audio sensor 112 may acquire data related to the intensity and/or frequency of each detected audio signal, and the activity determination system 110 may directly attribute the intensity and/or frequency to each audio signal as determined by the audio sensor 112. Moreover, the activity determination system 110 may identify a location of an audio signal by determining respective intensities of the audio signal received by each audio sensor 112 and comparing the determined intensities with the location of each audio sensor 112. For instance, if a first audio sensor 112 associates an audio signal with a first intensity, a second audio sensor 112 associates the audio signal with a second intensity substantially similar to the first intensity, and a third audio sensor 112 associates the audio signal with a third intensity substantially less than the first and second intensity, the activity determination system 110 may determine the audio signal originated from a location that is located the same distance away from the first audio sensor 112 and the second audio sensor 112, and a greater distance away from the third audio sensor 112.

In some embodiments, the activity determination system 110 may be implemented to determine when a signal is received. That is, the activity determination system 110 may associate each signal with a particular time interval, such as a time of the day, a day of the week, and so forth. Additionally, the activity determination system 110 may be implemented to determine where a signal is received, such as at a location within the structure 101.

At block 186, the activity determination system 110 creates initial wireless and audio signal profiles based on the resultant signals received at block 182. The wireless and audio signal profiles may be used as a reference or baseline to which subsequently received wireless and audio signals are compared. In some embodiments, the wireless and audio signal profiles are associated with a time interval, such that the activity determination system 110 may store a schedule that includes when certain signals are expected to occur. The wireless and audio signals may also be associated with a particular pattern or sequence. That is, the activity determination system 110 may determine a common order that certain signals are occurring (e.g., a first audio signal at a first location, a second audio signal at a second location, then a wireless signal).

In additional embodiments, the activity determination system 110 may determine how certain signals are regularly received in the structure 101. As an example, the activity determination system 110 may determine that an audio signal of a particular intensity, frequency, and so forth, only occurs at a specific location within the structure 101. In another example, the activity determination system 110 may determine that a specific computing device 106 is typically in a particular location within the structure 101 based on how the computing device 106 transmits and receives wireless signals. In further embodiments, the activity determination system 110 may determine how signals are received with respect to other signals. For instance, the activity determination system 110 may determine that when a first audio signal (e.g., a doorbell rang by a first person) is received, a first wireless signal (e.g., indicative of a second person moving to a door to let the first person into the structure 101) is received soon thereafter, followed by receiving a second audio signal (e.g., the door opening) and a second wireless signal (e.g., indicative of a connection of a specific computing device 106 of the first person entering the structure 101).

In certain embodiments, wireless and audio signal profiles may be specifically associated with a particular structure

101. That is, each structure 101 may be associated with a unique set of wireless and audio signal profiles as compared to that of any other structures 101 that may use the activity determination system 110. However, it should be noted that in some embodiments, the activity determination system 110 may generate wireless and audio signal profiles for a particular structure 101 based on wireless and audio signals received from one or more other structures 101. For example, general wireless and audio signal profiles may be stored in a cloud database accessible by multiple activity determination systems 110 that are each associated with a different structure 101. As such, the same wireless and audio signal profiles may be shared by multiple activity determination systems 110, such that different activity determination systems 110 may refer to the same wireless and audio signal profiles to determine anomalous activities that vary from the wireless and audio signal profiles.

Furthermore, the activity determination system 110 may associate particular wireless and/or audio signal profiles with certain anomalous activities. For instance, the user may manually input feedback cause the activity determination system 110 to associate a recurring audio signal with a particular activity, such as a mailed package delivery, occurring at the same time each week. The activity determination system 110 may also associate wireless and/or audio signal profiles based on certain characteristics of the wireless and/or audio signals. For example, the activity determination system 110 may associate a particular audio signal having a specific frequency, intensity, location of occurrence, and so forth, with an operation of a device of the structure 101, such as a furnace, an air conditioning unit, an appliance, an automated device, or the like. Thus, each time the activity determination system 110 receives the particular audio signal, the activity determination system 110 may determine that a particular device (e.g., the furnace) is in operation.

At block 188, the activity determination system 110 may remove certain wireless and audio signals from the initially created wireless and audio signal profiles, in which the removed wireless and audio signals may be associated with anomalous activities or noise. In some embodiments, the activity determination system 110 may receive a user input indicative of a user manually removing certain wireless and/or audio signals, such as based on a parameter associated with the wireless and/or audio signals. In additional embodiments, the activity determination system 110 may be programmed to remove wireless and/or audio signals based on parameters associated with the wireless and/or audio signals, such as wireless and/or audio signals that exceed some threshold or do not match expected wireless and audio signals simulated for the structure 101. For example, wireless and audio signals acquired at a certain time interval, that follow a certain sequence or pattern, that originate from a particular location, and the like, may be filtered from the initially created profiles. In further embodiments, the activity determination system 110 may determine average wireless and/or audio signals received over a period of time. The activity determination system 110 may then remove certain received wireless and audio signals that deviate (e.g., different than some threshold) from the determined average wireless and audio signals.

As a result of removing certain wireless and audio signals from the initial wireless and audio signal profiles, the activity determination system 110 may produce expected wireless and audio signals, or wireless and audio signals that are not associated with anomalous activities in the structure 101. In some implementations, the activity determination system 110 may determine the expected signals with respect to a certain time interval. For example, the activity determination system 110 may determine that a particular audio signal (e.g., a doorbell) occurs around a specific time during each week. Thus, the activity determination system 110 may expect the particular audio signal to occur each week at the specific time. In another implementation, the activity determination system 110 may expect to receive certain signals based on an established pattern or sequence. For instance, the activity determination system 110 may determine that two particular audio signals occur in sequential order. As a result, the activity determination system 110 may expect to receive the signals indicative of the two particular audio signals in the sequential order. In a further implementation, the activity determination system 110 may determine that certain signals are regularly occurring and are expected to be received. In one example, the activity determination system 110 determines that certain audio signals, which may be indicative of fluid flow, consistently originate at specific locations within the structure 101, such as within piping of the structure 101. As such, the activity determination system 110 use the received audio signals to indicate whether such audio signals are originating at the specific locations or different locations within the structure 101. Moreover, the activity determination system 110 may expect that other audio signals should not be originating at the aforementioned specific locations within the structure 101.

FIG. 4 is a flowchart of an embodiment of a method or process 200 for determining an anomalous activity by referencing established wireless and/or audio signal profiles. At block 202, the activity determination system 110 receives wireless and audio signals from the wireless signal transceiver 108, the audio sensor 112, and/or the database 114 after the wireless and audio signal profiles have already been created and refined (e.g., via the steps of method 180).

At block 204, the activity determination system 110 compares the wireless and audio signals received at block 202 with the expected wireless and audio signals. In some embodiments, the activity determination system 110 may compare characteristics of the received wireless and/or audio signals with expected characteristics of the wireless and/or audio signals. For example, the activity determination system 110 may compare a time, a sequence, an intensity, a frequency, a location, another parameter, or any combination thereof, of the received wireless and/or audio signals with the corresponding expected characteristics of the wireless and/or audio signals based on the created wireless and audio signal profiles.

At block 206, the activity determination system 110 may determine if there is a variance between the received wireless and/or audio signals and the expected wireless and audio signals in response to the comparison performed at block 204. If the activity determination system 110 determines there is no variance, the activity determination system 110 may determine that no anomalous activity is occurring in the structure 101. As a result, the activity determination system 110 may not perform any further actions and may continue to receive wireless and audio signals of the structure 101 (e.g., as performed at block 202) from the wireless signal transceiver 108, the audio sensor 112, the database 114, or any combination thereof.

However, if the activity determination system 110 determines that a variance exists (e.g., above some threshold), the activity determination system 110 may determine that there is an anomalous activity occurring in the structure 101. By way of example, the variance may be associated with a time threshold, in which the activity determination system 110 may determine that a signal is received at an unexpected time, or that a signal is not received at an expected time, is related to an anomalous activity. In one example, a particular wireless and/or audio signal is expected to be received at a particular time each day, such as to indicate when a certain component (e.g., an assembly line) is initiating an operation. Therefore, when the particular wireless and/or audio signal is received at an unexpected time of day, the activity determination system 110 may determine an anomalous activity is occurring, in which the component is not operating as expected. In another example, a wireless signal pertaining to a particular computing device 106 is expected to be received at a particular time each day, such as to indicate when a user is located within the structure 101. Thus, when the wireless signal is not received at the particular time of a day, or when an unexpected wireless signal pertaining to an unexpected computing device 106 is received, the activity determination system 110 may determine that an anomalous activity has occurred, in which the expected user is not within the structure 101 at the expected time and/or that an unexpected user is within the structure 101 at the expected time.

In another example, the activity determination system 110 may determine that a different characteristic, such as indicative of a location, an intensity, and/or frequency, of wireless and audio signals varies from the expected wireless and audio signals, respectively, varies by more than another threshold. For example, certain expected audio signals (e.g., low frequency, low intensity) indicate fluid flow through piping at particular locations within the structure 101. However, when audio signals of similar frequencies and intensities are received by the activity determination system 110 at other locations that vary from the expected locations by a distance threshold, the activity determination system 110 may determine an anomalous activity is occurring, such as change in the configuration of the piping that may result in undesired fluid flow within the structure 101. Likewise, when audio signals of different frequencies and intensities are received by the activity determination system 110 at the particular locations to indicate a change in fluid flow (e.g., a decreased fluid flow rate indicative of a clog) within the piping, the activity determination system 110 may determine that another anomalous activity is occurring.

In further embodiments, the activity determination system 110 may determine that specific sequences of wireless and audio signals are expected. When a received sequence of wireless and audio signals vary from the expected sequence by a sequence threshold, the activity determination system 110 may determine an anomalous activity is occurring. For example, as mentioned herein, the activity determination system 110 may expect a sequence of a first audio signal (e.g., a doorbell rang by a first person), a first wireless signal (e.g., indicative of a second person moving to a door to let the first person into the structure 101), a second audio signal (e.g., the door opening), and a second wireless signal (e.g., indicative of a connection of a specific computing device 106 of the first person entering the structure 101). However, if the first audio signal is received and an unexpected audio signal (e.g., the door opening) is received without receiving the first wireless signal indicative that the second person has let in the first person, the activity determination system 110 may determine that an anomalous activity is occurring, such as a person entering the structure 101 without permission.

At block 208, in response to determining that an anomalous activity is occurring, the activity determination system 110 may perform further actions to mitigate the effect of the anomalous activity. In some embodiments, the activity determination system 110 may output a control signal (e.g., send a command) to adjust an operation of a device present within the structure 101. As an example, if the activity determination system 110 determines that fluid is flowing outside of the piping of the structure 101, the activity determination system 110 may output a control signal to a device (e.g., a controller) to shut off certain fluid sources and/or adjust valves of the piping such that fluid flow is restricted through the piping of the structure 101. Therefore, fluid flow outside of the piping of the structure 101 may be reduced until maintenance is performed. Additionally, the activity determination system 110 may be configured to output a control signal to adjust an operation of other devices of the structure 101 based on the anomalous activity occurring, such as to adjust an energy consumption of a device (e.g., operating a furnace at an increased or decreased level), to disable or suspend the operation of a device (e.g., shutting off lights), initiating the operation of a device (e.g., locking a door), to perform another suitable adjustment of the operation of a device, or any combination thereof in response to an anomalous activity being detected. In this way, if an intruder or unwanted entrant enters the structure 101, the activation or adjustment of operation of various devices may cause the intruder to leave.

In additional embodiments, the activity determination system 110 may output a control signal that sends a notification indicative of the anomalous activity occurring in the structure 101. For example, the activity determination system 110 may output a control signal to send a notification to a computing device 106 associated with the activity determination system 110 such that a user of the computing device 106 is alerted of the anomalous activity. As another example, the activity determination system 110 may output a control signal to broadcast a general notification (e.g., a sound, a light) to indicate the presence of the anomalous activity. Thus, those alerted by the notification may take further action to mitigate the anomalous activity.

In further embodiments, the activity determination system 110 may output a control signal to send a notification that includes instructions associated with information that may help mitigation of the anomalous activity. For example, the instruction may include what anomalous activity may be occurring (e.g., based on characteristics of the received wireless and audio signals), how similar anomalous activities may have been resolved previously, and the like. As such, the activity determination system 110 may generate and cause a particular notification to be sent based on the wireless and/or audio signals received.

FIG. 5 is a flowchart of another embodiment of a method 230 for determining an anomalous activity by determining an activity based on received wireless and audio signals. At block 232, the activity determination system 110 receives wireless and audio signals of the structure 101 from the wireless signal transceiver 108, the audio sensor 112, the database 114, or any combination thereof.

At block 234, the activity determination system 110 determines the activity based on the received wireless and audio signals. The activity determination system 110 may determine certain characteristics of the wireless and audio signals to determine the associated activity. In an example, if the activity determination system 110 determines that there are more than a threshold number of people in a residential home based on the interference of wireless signals and/or the presence of many audio signals occurring throughout the structure 101, the activity determination system 110 may determine that there is an eventful gathering within the structure 101. In an additional example, if the activity determination system 110 determines rapid movement of a person in the structure 101, the activity determination system 110 may determine that the person is running in the structure 101.

In certain implementations, the activity determination system 110 may determine biometric data associated the structure 101 (e.g., biometric data of people in the structure 101) based on the received wireless and audio signals. For instance, using the wireless interference, the activity determination system 110 may determine motion of a person's body part (e.g., torso movement) to determine the person's respiratory rate and/or heart rate. The activity determination system 110 may also be implemented to determine the posture of the person based on the geometry of the person. Further, the activity determination system 110 may determine an emotion and/or a reaction of the person based on the biometric data. By way of example, the activity determination system 110 may determine that a person is sad based on a decreased respiratory rate and heart rate, and a hunched stance.

In response to determining the activity, the activity determination system 110 may determine if the activity is an anomaly (block 236). In some implementations, the activity determination system 110 may merely determine if respective characteristics of received wireless and/or audio signals are anomalies. For example, if the activity determination system 110 receives an audio signal that has a very high intensity (e.g., above a threshold intensity), the activity determination system 110 may determine that an anomalous activity has occurred (e.g., an object fell within the structure 101). In another example, the activity determination system 110 may determine that the number of people in the structure 101 is above the threshold, such as based on the quantity of computing devices 106 transmitting and receiving wireless signals, and whether the number of wireless signals from different computing devices 106 are more than some threshold rated for the structure 101. In a further example, the activity determination system 110 may determine that movement of a person is an anomalous activity, such as a vertical fall, based on the depicted change in position of the person as indicated by the wireless signals. Further still, the activity determination system 110 may determine that biometric data of a person (e.g., heart rate and/or respiratory rate) is above or below a threshold to indicate a possible health issue.

In additional implementations, the activity determination system 110 may determine an anomalous activity has occurred based on a combination of characteristics of received wireless and/or audio signals. For example, if the activity determination system 110 determines that a first person is asleep in one location of the structure 101 (e.g., based on biometric data determined via the wireless signals) and a second person is entering the structure 101, the activity determination system 110 may determine a possible anomalous activity involving an intruder because the corresponding wireless and/or audio profile does not include the activity as an expected activity. Moreover, the activity determination system 110 may identify an anomalous activity based on a positioning of multiple people in relation to one another in the structure 101. For instance, the activity determination system 110 may determine that a first person is chasing a second person within the structure 101 based on the respective wireless signals associated with the first and second person (e.g., two respective wireless signals are following one another and the wireless signals indicate increased heart rates and respiratory rates). Further still, the activity determination system 110 may identify an anomalous activity based on a relation between a person in the structure 101 and an audio signal. That is, for example, the activity determination system 110 may determine an audio signal (e.g., indicative of an operation of a device that would require maintenance) has originated at a particular location within the structure 101, but a person in the structure 101 is moving away from the particular location. Thus, the activity determination system 110 may determine an anomalous activity is occurring because the person is not heading toward where the audio signal originated (e.g. to perform maintenance on a device).

If the activity determination system 110 determines the structural activity is not an anomaly, the activity determination system 110 may not perform further actions. As such, the activity determination system 110 may continue to receive wireless and audio signals without sending a control signal to adjust a device of the structure 101 or sending a notification.

At block 238, the activity determination system 110 may output a control signal to a device of the structure 101 and/or output a control signal to send a notification, similar to the steps described with respect to block 208 in response to detecting the anomalous activity at block 236. That is, the activity determination system 110 outputs a control signal to the device to adjust an operation of a device to mitigate the effect of the anomalous activity and/or may output a control signal send a notification to a computing device 106 to notify a person such that the person may tend to and mitigate the anomalous activity. For example, if a person is moving away from where an audio signal originated, the activity determination system 110 may output a control signal to send a notification to the person to provide a location of the audio signal and/or instructions that guide the person toward the audio signal.

Embodiments of the present disclosure are directed to an activity determination system that monitors wireless and/or audio signals of a structure to determine if anomalous activities associated with the structure are occurring. In some embodiments, the activity determination system may establish or create wireless and/or audio signal profiles for reference, in which the wireless and audio signal profiles include wireless and/or audio signals that are expected to be received, such as during a particular time interval, of a certain sequence, and so forth. Thus, the activity determination system may compare received wireless and/or audio signals with the expected wireless and/or audio signals and determine if an anomalous activity is occurring based on the comparison (e.g., a variance associated with the comparison). In additional embodiments, the activity determination system may determine if an anomalous activity is occurring based on certain characteristics of the received wireless and audio signals. In response to determining that an anomalous activity is occurring, the activity determination system may perform further actions to mitigate the effect of the anomalous activity. For example, the activity determination system may output a control signal to adjust an operation of a device, and/or may send a notification to alert one or more people. As a result, the activity determination system may improve mitigation of the effects of anomalous activities, such as how quickly anomalous activities are mitigated after occurring.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform] ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
   a transceiver configured to receive a plurality of Wi-Fi signals associated with a structure at a plurality of times;
   an audio sensor configured to receive a plurality of audio signals at the plurality of times; and
   a processor comprising computer-executable instructions configured to cause the processor to perform operations comprising:
      receiving the plurality of Wi-Fi signals and the plurality of audio signals;
      generate a baseline wireless signal profile associated with the structure based on the plurality of Wi-Fi signals;
      generate a baseline audio signal profile associated with the structure based on the plurality of audio signals;
      generate a modified Wi-Fi signal profile and a modified audio signal profile comprising a portion of the baseline wireless signal profile and a portion of the baseline audio signal profile;
      receiving an additional plurality of Wi-Fi signals and an additional plurality of audio signals at an additional plurality of times;
      comparing the additional plurality of Wi-Fi signals with the modified Wi-Fi signal profile;
      comparing the additional plurality of audio signals with the modified audio signal profile; and
      outputting a control signal to actuate a device in the structure in response to:
         determining that the additional plurality of Wi-Fi signals and the modified Wi-Fi signal profile vary by greater than a first threshold;
         determining that the additional plurality of audio signals and the modified audio signal profile vary by greater than a second threshold; or
         both.

2. The system of claim 1, wherein the computer-executable instructions are configured to cause the processor to generate the modified Wi-Fi signal profile by removing one or more portions of the baseline wireless signal profile.

3. The system of claim 2, wherein the one or more portions of the baseline wireless signal profile corresponds to an anomaly activity occurring.

4. The system of claim 3, wherein the computer-executable instructions are configured to cause the processor to receive an input configured to identify the one or more portions of the baseline wireless signal profile as including the anomaly activity.

5. The system of claim 1, wherein the computer-executable instructions are configured to cause the processor to generate the modified audio signal profile by removing one or more portions of the baseline audio signal profile.

6. The system of claim 5, wherein the one or more portions of the baseline wireless signal profile corresponds to an anomaly activity occurring.

7. The system of claim 6, wherein the computer-executable instructions are configured to cause the processor to receive an input configured to identify the one or more portions of the baseline audio signal profile as including the anomaly activity.

8. A method, comprising:

receiving a plurality of Wi-Fi signals from a transceiver and a plurality of audio signals from an audio sensor;

generating a baseline wireless signal profile associated with a structure based on the plurality of Wi-Fi signals;

generating a baseline audio signal profile associated with the structure based on the plurality of audio signals;

generating a modified Wi-Fi signal profile and a modified audio signal profile comprising a portion of the baseline wireless signal profile and a portion of the baseline audio signal profile;

receiving an additional plurality of Wi-Fi signals and an additional plurality of audio signals at an additional plurality of times;

comparing the additional plurality of Wi-Fi signals with the modified Wi-Fi signal profile;

comparing the additional plurality of audio signals with the modified audio signal profile; and outputting a control signal to actuate a device in the structure in response to:

determining that the additional plurality of Wi-Fi signals and the modified Wi-Fi signal profile vary by greater than a first threshold;

determining that the additional plurality of audio signals and the modified audio signal profile vary by greater than a second threshold; or both.

9. The method of claim 8, wherein generating the modified Wi-Fi signal profile comprises removing one or more portions of the baseline wireless signal profile.

10. The method of claim 9, wherein the one or more portions of the baseline wireless signal profile corresponds to an anomaly activity occurring.

11. The method of claim 10, comprising receiving an input configured to identify the one or more portions of the baseline wireless signal profile as including the anomaly activity.

12. The method of claim 8, comprising generating the modified audio signal profile by removing one or more portions of the baseline audio signal profile.

13. The method of claim 12, wherein the one or more portions of the baseline wireless signal profile corresponds to an anomaly activity occurring.

14. The method of claim 13, comprising receiving an input configured to identify the one or more portions of the baseline audio signal profile as including the anomaly activity.

15. A non-transitory computer-readable medium comprising computer-executable instructions that, when executed, are configured to cause a processing system to perform operations comprising:

receiving a plurality of Wi-Fi signals from a transceiver and a plurality of audio signals from an audio sensor;

generating a baseline wireless signal profile associated with a structure based on the plurality of Wi-Fi signals;

generating a baseline audio signal profile associated with the structure based on the plurality of audio signals;

generating a modified Wi-Fi signal profile and a modified audio signal profile based on a portion of the baseline wireless signal profile and a portion of the baseline audio signal profile;

receiving an additional plurality of Wi-Fi signals and an additional plurality of audio signals at an additional plurality of times;

comparing the additional plurality of Wi-Fi signals with the modified Wi-Fi signal profile;

comparing the additional plurality of audio signals with the modified audio signal profile; and outputting a control signal to actuate a device in the structure in response to:

determining that the additional plurality of Wi-Fi signals and the modified Wi-Fi signal profile vary by greater than a first threshold;

determining that the additional plurality of audio signals and the modified audio signal profile vary by greater than a second threshold; or both.

16. The non-transitory computer-readable medium of claim 15, wherein the computer-executable instructions are configured to cause the processing system to generate the modified Wi-Fi signal profile by removing one or more portions of the baseline wireless signal profile.

17. The non-transitory computer-readable medium of claim 16, wherein the one or more portions of the baseline wireless signal profile corresponds to an anomaly activity occurring.

18. The non-transitory computer-readable medium of claim 16, wherein the computer-executable instructions are configured to cause the processing system to perform the operations comprising receiving an input configured to identify the one or more portions of the baseline wireless signal profile as including the anomaly activity.

19. The non-transitory computer-readable medium of claim 15, wherein the computer-executable instructions are configured to cause the processing system to perform the operations comprising generating the modified audio signal profile by removing one or more portions of the baseline audio signal profile, wherein the one or more portions of the baseline wireless signal profile corresponds to an anomaly activity occurring.

20. The non-transitory computer-readable medium of claim 19, wherein the computer-executable instructions are configured to cause the processing system to receive an input configured to identify the one or more portions of the baseline audio signal profile as including the anomaly activity.

* * * * *